US012773655B2

(12) United States Patent
Baxter

(10) Patent No.: US 12,773,655 B2
(45) Date of Patent: Oct. 27, 2026

(54) FILTER DIAGNOSTIC SYSTEM AND METHOD

(71) Applicant: Dust Company, Inc., Raleigh, NC (US)

(72) Inventor: Robert W. Baxter, Raleigh, NC (US)

(73) Assignee: Dust Company, Inc., Raleigh, NC (US)

( * ) Notice: Subject to any disclaimer, the term of this patent is extended or adjusted under 35 U.S.C. 154(b) by 191 days.

(21) Appl. No.: 16/821,619

(22) Filed: Mar. 17, 2020

(65) Prior Publication Data

US 2020/0298163 A1 Sep. 24, 2020

Related U.S. Application Data

(60) Provisional application No. 62/819,968, filed on Mar. 18, 2019.

(51) Int. Cl.
*B01D 46/00* (2022.01)
*B01D 46/04* (2006.01)
*G07C 3/08* (2006.01)

(52) U.S. Cl.
CPC ......... *B01D 46/0086* (2013.01); *B01D 46/04* (2013.01); *G07C 3/08* (2013.01); *B01D 2201/56* (2013.01)

(58) Field of Classification Search
CPC ........................... B01D 46/0086; B01D 46/04; B01D 2201/56; B01D 46/02; B01D 46/46; B01D 46/71; B01D 46/44; G07C 3/08

(Continued)

(56) References Cited

U.S. PATENT DOCUMENTS 4,624,689 A * 11/1986 Volk ........................ B01D 46/04
96/397
5,324,344 A 6/1994 Broyan et al.
(Continued)

FOREIGN PATENT DOCUMENTS

CN 109999583 7/2019
CN 110585811 12/2019
(Continued)

OTHER PUBLICATIONS

Appendix 1 to the Oct. 2019 Patent Eligibility Guidance. (Year: 2019).*

(Continued)

*Primary Examiner* — T. Bennett Mckenzie
(74) *Attorney, Agent, or Firm* — Myers Bigel, P.A.

(57) ABSTRACT

A baghouse filter system includes a fabric filter; a control system coupled to the bag house filter system that is configured to control filtering operations of the baghouse filter system and cleaning operations of the baghouse filter system; a plurality of data collection devices that are configured to collect data associated with a plurality of operational and cleaning parameters of the baghouse filter system; and a diagnostic system that is configured to receive the data associated with the plurality of operational and cleaning parameters of the baghouse filter system independent of the control system, to determine whether a performance of the baghouse filter system is degraded based on the data associated with the plurality of operational and cleaning parameters, and to perform a plurality of targeted diagnostic analyses of the data associated with the plurality of operational and cleaning parameters, the plurality of targeted diagnostic analyses corresponding to a plurality of performance metrics of the baghouse filter system.

18 Claims, 9 Drawing Sheets

(58) Field of Classification Search
USPC .... 95/1; 55/282–305, 341.1–341.7, 361–382
See application file for complete search history.

(56) References Cited

U.S. PATENT DOCUMENTS

| | | | | |
|---|---|---|---|---|
| 5,427,596 | A * | 6/1995 | Jorgenson | B01D 46/24 96/418 |
| 5,549,734 | A * | 8/1996 | Standard | B01D 46/71 95/279 |
| 2005/0188662 | A1* | 9/2005 | Kelsey | B01D 46/4272 55/283 |
| 2006/0151926 | A1* | 7/2006 | Zoeller | B28B 11/006 264/603 |
| 2009/0095152 | A1* | 4/2009 | Lindsey | B01D 46/442 96/417 |
| 2010/0018173 | A1* | 1/2010 | Park | B01D 50/20 55/323 |
| 2011/0023709 | A1* | 2/2011 | Bosshard | B01D 46/442 96/417 |
| 2011/0056274 | A1* | 3/2011 | Bunod | G01M 3/229 73/40 |
| 2013/0255485 | A1* | 10/2013 | Appelo | B01D 46/04 95/20 |
| 2017/0028337 | A1 | 2/2017 | Baxter | |
| 2017/0036154 | A1 | 2/2017 | Lauterbrunner et al. | |
| 2019/0076771 | A1 | 3/2019 | Baxter et al. | |
| 2019/0209957 | A1* | 7/2019 | Silvestro | B01D 46/70 |
| 2020/0298163 | A1 | 9/2020 | Baxter | |

FOREIGN PATENT DOCUMENTS

| | | | |
|---|---|---|---|
| EP | 3921060 | A1 | 12/2021 |
| KR | 20020016227 | | 3/2002 |
| WO | 95/07131 | | 3/1995 |
| WO | 2020190924 | A1 | 9/2020 |

OTHER PUBLICATIONS

International Search Report and Written Opinion corresponding to PCT/US2020/023115; mailed May 28, 2020 (15 pages).

First Substantive Report corresponding to CL 202102404; dated Dec. 15, 2022 (17 pages, including English translation).

EP Examination Report corresponding to EP 20718944.0; dated May 17, 2023 (7 pages).

First Mexican Office Action corresponding to MX/a/2021/011245, Dec. 11, 2024, 9 pp.

First Canadian Office Action corresponding to CA 3133444, Feb. 20, 2025, 4 pp.

* cited by examiner

FILTER DIAGNOSTIC SYSTEM AND METHOD

CROSS REFERENCE TO RELATED APPLICATION

The present application claims priority to U.S. Provisional Patent Application Ser. No. 62/819,968, filed Mar. 18, 2019, the entire content of which is incorporated by reference herein as if set forth in its entirety.

FIELD OF THE INVENTION

The present invention relates to industrial pollution control systems and, more particularly, to fabric filter monitoring and diagnostic systems for fabric filters. A fabric filter unit may comprise one or more compartments containing rows of fabric bags in the form of round, flat, or shaped tubes, or pleated cartridges. Fabric filters are sometimes referred to in industry as baghouses.

BACKGROUND

A baghouse or fabric filter, whether it uses traditional bags with cages or pleated cartridge filters, is an air pollution control device that removes particulates out of air or gas released from commercial processes or combustion for electricity generation. Many different types of industrial companies use baghouses to control emission of air pollutants including power plants, steel mills, pharmaceutical producers, food manufacturers, and chemical producers. Depending on the process requirements and/or air flow to be cleaned, baghouses can range from a single compartment filter to a large multi-compartment filter. Baghouses are generally defined by their cleaning methods. The two major categories are off-line cleaning baghouses and on-line cleaning baghouses. Off-line cleaning refers to the type of baghouse where the compartment is isolated and does not filter dirty air during the cleaning process. The types of baghouses using off-line cleaning include shakers, sonic horns, pulse-jet, and reverse air. On-line cleaning refers to a baghouse or compartment that is not isolated when it is cleaned and continues to filter dirty air. The only type of baghouse that currently uses on-line cleaning is a pulse-jet style baghouse.

The pulse-jet style baghouse design is based on energizing or firing the pulse-valves to generate a blast of air down each bag in a row. In some examples, pulse jet baghouses use a pulse of compressed air to send a pulse wave down a row of filtering bags to "shock" the filtered particles off of the outside of the bag so they can fall into the hopper below and be removed. This style of baghouse typically has one solenoid pilot valve for each row of bags. Larger baghouses may have split rows and may use two valves per row. The row valves are designed to open quickly to provide a short pulse and then close. Their source of air is normally a local supply header close to the valves. After the pulse, the header replenishes the pulsed air until it is at the desired pressure. The refilling process typically can take 1-5 seconds depending on the size and length of the supply line. In an off-line configuration, each compartment may use up to four additional outputs and four additional inputs. The outputs would be to open and close the inlet and output isolation valves and the input would be switches to confirm the isolation valve position.

Various performance metrics may be monitored as part of operating and managing a baghouse filter system. The various performance metrics to be monitored may vary based on the particular baghouse design. Moreover, performance metrics may be monitored for the baghouse as an entire entity and/or individual compartments. Thus, monitoring information or data may be compiled on a per-valve/row basis (on-line/pulse-jet configuration only) or on a per-compartment (off-line cleaning configuration only) basis.

Existing performance monitoring systems for baghouses typically have diagnostic features integrated into the system that is controlling the operation and/or cleaning of the fabric filter. This may allow the control system/operator to know which compartment or row is being cleaned. Existing performance monitoring systems may also provide diagnostics for particular parts of a fabric filter. For example, a flow sensor may be used to monitor and totalize the compressed air flow rate in an effort to detect problems with the controlling use valve. These systems, however, typically incorporate the diagnostics as part of the controller.

Specific equipment used in a baghouse filter system may also provide diagnostic capabilities as part of the control or cleaning process. For example, equipment, such as pulse-valve control systems, may provide a status of a solenoid valve after an attempt has been made to energize the valve. Various operation and/or cleaning control systems may provide specific diagnostic functions as part of the features that they offer.

These existing systems and equipment, however, do not provide a diagnostic system that is not integrated with the filter operational and/or cleaning control systems and that can diagnose operations of the baghouse filter and provide the results on a per row, per valve, and/or per compartment basis.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments of the inventive concept provide a system comprising a baghouse filter system comprising a fabric filter; a control system coupled to the bag house filter system that is configured to control filtering operations of the baghouse filter system and cleaning operations of the baghouse filter system; a plurality of data collection devices that are configured to collect data associated with a plurality of operational and cleaning parameters of the baghouse filter system; and a diagnostic system that is configured to receive the data associated with the plurality of operational and cleaning parameters of the baghouse filter system independent of the control system, to determine whether a performance of the baghouse filter system is degraded based on the data associated with the plurality of operational and cleaning parameters, and to perform a plurality of targeted diagnostic analyses of the data associated with the plurality of operational and cleaning parameters, the plurality of targeted diagnostic analyses corresponding to a plurality of performance metrics of the baghouse filter system.

In other embodiments, the diagnostic system is further configured to determine whether the performance of the baghouse filter system is degraded based on a maximum pulse of dust concentration value within the fabric filter and a maximum compressed air flow value directed to the fabric filter.

In still other embodiments, the plurality of operational and cleaning parameters comprise gas temperature, gas flow, exit dust concentration, differential pressure, compressed air header pressure, fan current, and/or hopper levels.

In still other embodiments, the plurality of performance metrics comprise a structural impairment of the fabric filter, an inadequate cleaning of the fabric filter, a failure of a solenoid valve, a failure of a diaphragm valve, a leak in a compressed air delivery system, a failure of a poppet valve, a failure of an isolation valve, an improper setting used by the control system, and a blinding of the fabric filter.

In still other embodiments, the diagnostic system is further configured to perform the plurality of targeted diagnostic analyses by performing a targeted diagnostic analysis on the structural impairment of the fabric filter. Performing the targeted diagnostic analysis on the structural impairment of the fabric filter comprises determining an average maximum pulse of dust concentration value for a first plurality of pulses of dust; and determining whether each of a second plurality of maximum pulse of dust concentration values exceed the average maximum pulse of dust concentration value.

In still other embodiments, the diagnostic system is further configured to perform the plurality of targeted diagnostic analyses by performing a targeted diagnostic analysis on the inadequate cleaning of the fabric filter. Performing the targeted diagnostic analysis on the inadequate cleaning of the fabric filter comprises determining whether the maximum compressed air flow value is less than an average maximum compressed air flow value computed for a plurality of compressed air pulses.

In still other embodiments, the diagnostic system is further configured to perform the plurality of targeted diagnostic analyses by performing a targeted diagnostic analysis on the inadequate cleaning of the fabric filter. Performing the targeted diagnostic analysis on the inadequate cleaning of the fabric filter comprises determining whether a compressed air flow value is greater than or equal to a minimum compressed air flow value limit.

In still other embodiments, the diagnostic system is further configured to perform the plurality of targeted diagnostic analyses by performing a targeted diagnostic analysis on the inadequate cleaning of the fabric filter. Performing the targeted diagnostic analysis on the inadequate cleaning of the fabric filter comprises determining whether a compressed air flow value performance signature deviates from a baseline compressed air flow value performance signature.

In still other embodiments, the diagnostic system is further configured to perform the plurality of targeted diagnostic analyses by performing a targeted diagnostic analysis on the failure of the solenoid valve. Performing the targeted diagnostic analysis on the failure of the solenoid valve comprises determining a difference between a dwell timing associated with an energization of the solenoid valve and a predicted energization of the solenoid valve.

In still other embodiments, the diagnostic system is further configured to perform the plurality of targeted diagnostic analyses by performing a targeted diagnostic analysis on the failure of the solenoid valve. Performing the targeted diagnostic analysis on the failure of the solenoid valve comprises determining whether a compressed air flow value performance signature deviates from a baseline compressed air flow value performance signature.

In still other embodiments, the diagnostic system is further configured to perform the plurality of targeted diagnostic analyses by performing a targeted diagnostic analysis on the failure of the diaphragm valve. Performing the targeted diagnostic analysis on the failure of the diaphragm valve comprises detecting an activation of the diaphragm valve; and determining whether a change in a dust concentration value exceeds a first defined threshold; and determining whether a compressed air flow value exceeds a second defined threshold.

In still other embodiments, the diagnostic system is further configured to perform the plurality of targeted diagnostic analyses by performing a targeted diagnostic analysis on the failure of the diaphragm valve. Performing the targeted diagnostic analysis on the failure of the diaphragm valve comprises determining whether a compressed air flow value performance signature deviates from a baseline compressed air flow value performance signature.

In still other embodiments, the diagnostic system is further configured to perform the plurality of targeted diagnostic analyses by performing a targeted diagnostic analysis on the failure of the diaphragm valve. Performing the targeted diagnostic analysis on the failure of the diaphragm valve comprises detecting an activation of the solenoid valve; determining whether an initial compressed air flow value is substantially zero responsive to activation of the solenoid valve; and determining whether a final compressed air flow value is non-zero responsive to deactivation of the solenoid valve.

In still other embodiments, the diagnostic system is further configured to perform the plurality of targeted diagnostic analyses by performing a targeted diagnostic analysis on the blinding of the fabric filter. Performing the targeted diagnostic analysis on the blinding of the fabric filter comprises determining an average maximum pulse of dust concentration value for a first plurality of pulses of dust; determining whether a second plurality of maximum pulse of dust concentration values exceed the average maximum pulse of dust concentration value; and determining whether a compressed air flow value performance signature deviates from a baseline compressed air flow value performance signature.

Some embodiments of the inventive concept provide a method comprising receiving data associated with a plurality of operational and cleaning parameters of a baghouse filter system independent of a control system configured to control filtering and cleaning operations of the baghouse filter system; determining whether a performance of the baghouse filter system is degraded based on the data associated with the plurality of operational and cleaning parameters; and performing a plurality of targeted diagnostic analyses of the data associated with the plurality of operational and cleaning parameters, the plurality of targeted diagnostic analyses corresponding to a plurality of performance metrics of the baghouse filter system.

In further embodiments, determining whether the performance of the baghouse filter system is degraded comprises determining whether the performance of the baghouse filter system is degraded based on a maximum pulse of dust concentration value within the fabric filter and a maximum compressed air flow value directed to the fabric filter.

In still further embodiments, the plurality of operational and cleaning parameters comprise gas temperature, gas flow, exit dust concentration, differential pressure, compressed air header pressure, fan current, and/or hopper levels.

In still further embodiments, the plurality of performance metrics comprise a structural impairment of the fabric filter, an inadequate cleaning of the fabric filter, a failure of a solenoid valve, a failure of a diaphragm valve, a leak in a compressed air delivery system, a failure of a poppet valve, a failure of an isolation valve, an improper setting used by the control system, and a blinding of the fabric filter.

In still further embodiments, performing the plurality of targeted diagnostic analyses comprises performing a targeted diagnostic analysis on the structural impairment of the fabric filter, on the inadequate cleaning of the fabric filter, on the failure of the solenoid valve, on the failure of the diaphragm valve, or on the blinding of the fabric filter.

Other methods, systems, computer program products and/or apparatus according to embodiments of the inventive concept will be or become apparent to one with skill in the art upon review of the following drawings and detailed description. It is intended that all such additional methods, systems, computer program products, and/or apparatus be included within this description, be within the scope of the present invention, and be protected by the accompanying claims. It is noted that aspects of the invention described with respect to one embodiment, may be incorporated in a different embodiment although not specifically described relative thereto. That is, all embodiments and/or features of any embodiment can be combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
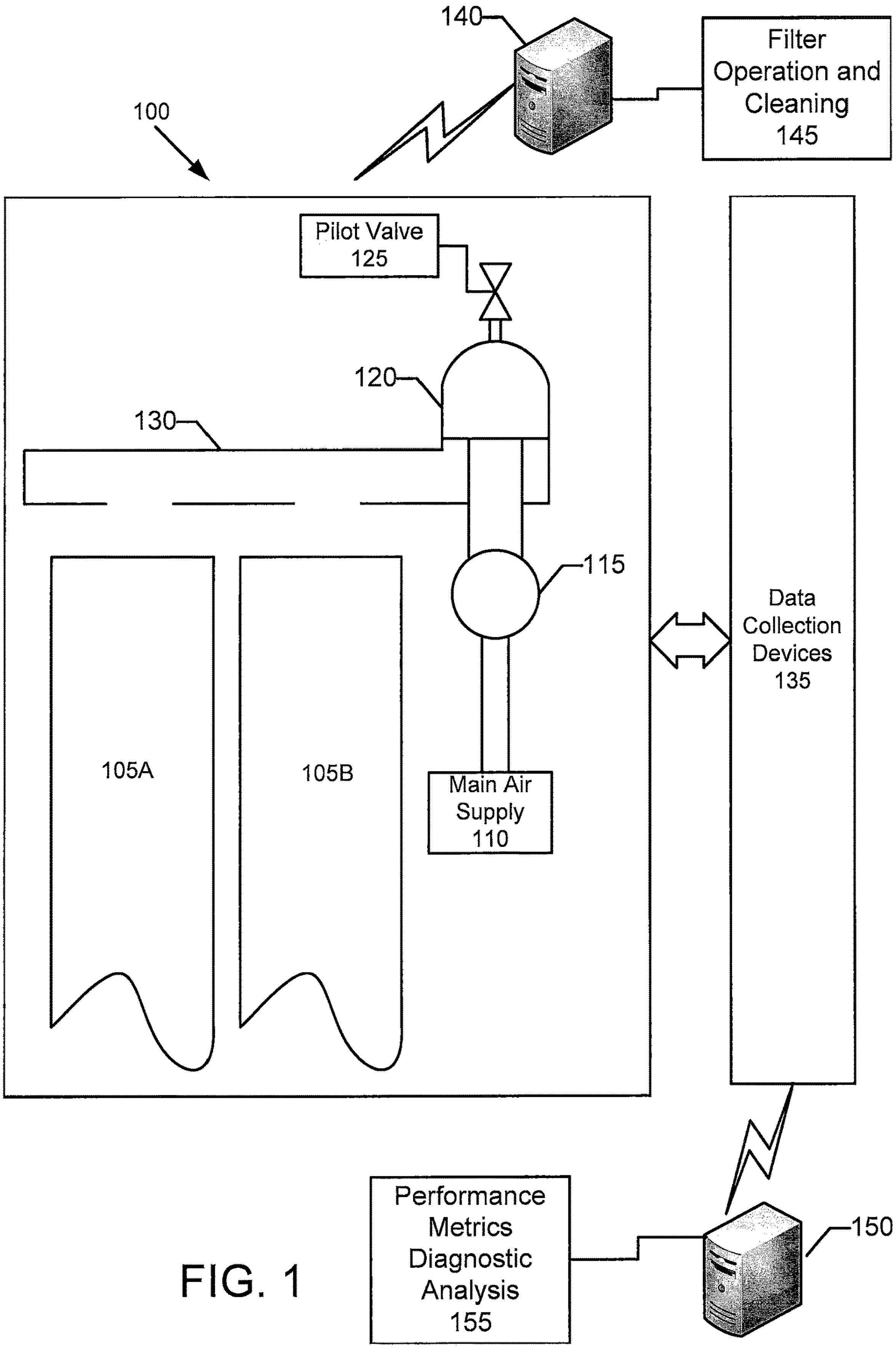
FIG. 1 is a diagram that illustrates a system for operating, cleaning, and diagnosing a fabric filter, such as a baghouse, according to some embodiments of the inventive concept.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments of the inventive subject matter are described herein with respect to maintaining a fabric filter including the cleaning thereof. As described above, a fabric filter unit may comprise one or more compartments containing rows of fabric bags in the form of round, flat, or shaped tubes, and/or pleated cartridges. Fabric filters may be referred to in industry as baghouses.

As used herein a statistical pulse of air that is generated in response to the opening and closing of a solenoid pilot valve or pulsing valve has a duration that begins with the opening of the valve and ends when the air flow returns to an ambient level, typically zero or no flow, and/or ends when a pressure in a header supply tank returns to an ambient pressure level after dropping in response to the opening of the valve.

Embodiments of the inventive concept may provide a system and method, which can be installed alongside an existing filter control system, e.g., system that managers the filter operation and/or cleaning, to provide real-time monitoring and diagnostics on a per row/valve and/or compartment basis, based on the cleaning style, e.g., particular baghouse configuration. In accordance with different embodiments of the inventive concept, the system may be comprised of various parts and sub-systems, which are based on the specific needs of an application and may be configured to function as a single system. In some embodiments, the system may monitor various process parameters, as needed, to perform the diagnostic analysis based on the specific application. The parameters may be associated with operational and/or cleaning characteristics of a fabric filter and may be used to evaluate various performance metrics as part of a diagnostic analysis. The operational and/or cleaning parameter may include, but are not limited to, gas temperature, gas flow or velocity, exit dust concentration (e.g., the concentration of particulate matter in the gas as it is exiting the baghouse filter), differential pressure (differences in air pressure across an entire baghouse or with respect to individual compartments), compressed air header pressure (applies to pulse-jet style baghouses), fan current (a dirty filter may cause a fan to draw more current to push air through the system), and/or hopper levels (quantity of particular matter dislodged from a filter and caught in a hopper).

The actual parameters may change slightly with each filter application. Thus, embodiments of the inventive concept may be configured to adapt to different cleaning techniques and/or baghouse filter types, such as, but not limited to, on-line cleaning baghouses, pulse-jet cleaning baghouses, off-line cleaning baghouses, reverse air cleaning bag houses, shaker cleaning bag houses, and sonic horn cleaning baghouses.

According to some embodiments of the inventive concept, the filter diagnostic system may not interfere with the control system for the baghouse or filter. That is, the filter diagnostic system may be independent of the control system used to manage the baghouse filter operation and/or cleaning inasmuch as the filter diagnostic system does not rely on the control system to execute diagnostic tests, perform diagnostic analyses, and/or collect and communicate data/information corresponding to operational and/or cleaning parameters/performance metrics. In some embodiments, a non-invasive monitoring technique may be used to diagnose the status of the baghouse filter system. This technique can wired or wireless and can include one or more of magnetic reed switches, optical switches, pressure switches, flow switches, proximity sensors, etc., depending on the application needs and limitations, for the diagnostic system to identify the specific valve and/or compartment being cleaned. This may allow the system to initiate a statistical diagnostic routine for the filter's cleaning type. The diagnostic routine may be designed to diagnose the performance of the baghouse filter for one or more performance metrics. The system may then summarize the results for each cleaning event on a per-row (on-line cleaning pulse jet filter) or per compartment (off-line cleaning filter) basis. This information may be summarized and provided to the user in real-time and, in some embodiments, may also be read by the filter control system. A diagnostic history may be provided that may allow users to review previous performance information.

The diagnostic system may be configured to identify many aspects of a filter's performance based on the needs of the application. These performance metrics may include, but are not limited to a structural impairment of the fabric filter, e.g., broken/leaking fabric filter (per row or compartment), an inadequate cleaning of the fabric filter, a failure of a solenoid valve, a failure of a diaphragm valve, e.g., leaking or stuck, a leak in a compressed air delivery system, a failed/not seated poppet valve, a failure of an isolation valve (offline cleaning), an improper setting used by the control system, e.g., header pressure, temperature, gas flow rate, and the like, and a blinding of the fabric filter (per row or compartment). Diagnostic criteria for the various performance metrics may be applied to evaluate whether one or more components of a filter is faulty.

FIG. 1 is a diagram that illustrates a fabric filter system 100, such as a baghouse, that includes an operation and cleaning system along with a separate performance metrics diagnostic system according to some embodiments of the inventive concept. In the example shown, the cleaning system uses compressed air as part of a pulse-jet style cleaning technique. It will be understood, however, that embodiments of the inventive concept are not limited to this type of baghouse or cleaning technique, but may be applicable to other types of cleaning techniques and baghouse configurations. As shown in FIG. 1, two fabric filters 105A and 105B are cleaned using a common air supply and valve system. The air supply includes a main air supply 110 and a header supply tank 115, which stores the compressed air in relatively close proximity to a control valve system. The control valve system includes a pulsing valve 120 and a solenoid pilot valve 125. The solenoid pilot valve 125 may be located on or near the pulsing valve 120 or may be located more remote from the pulsing valve 120 and connected with hose or piping. The pulsing valve 120 may be operable to release statistical pulses of compressed air down a blow tube 130, which directs the statistical air pulses into the fabric filters 105A and 105B to dislodge particles and other residue that accumulate in the filters. An air flow monitor may be used to monitor one or more metrics of the air flow flowing through the pulsing valve during a cleaning pulse including, but not limited to, a maximum air flow rate during the statistical pulse of air, a time duration of the statistical pulse of air, a total air consumption during the statistical pulse of air, a flow rate increase during the statistical pulse of air, and a flow rate decrease during the statistical pulse of air. A valve controller 140 is communicatively coupled to both the solenoid pilot valve 125 and the pulsing valve 120. These connections may be wired and/or wireless connections in accordance with various embodiments of the inventive concept. The valve controller 140 may control operation of the solenoid pilot valve 125 to initiate and terminate statistical pulses of air used to clean the fabric filters 105A and 105B. The valve controller 140 includes a filter operation and cleaning module 145 that is configured manage both filtering operations of the fabric filter system 100 and cleaning operations of the fabric filter system. The baghouse fabric filter system 100 further comprises data collection devices 135, which may include the air flow monitor, one or more of magnetic reed switches, optical switches, pressure switches, flow switches/sensors, proximity sensors, temperature sensors, particular matter concentration (dust concentration) analyzer/sensor, and the like that are configured to obtain data for one or more operational and/or cleaning parameters. These data may be used to evaluate one or more performance metrics to diagnose the filtering and/or cleaning operations of the entire baghouse fabric filter system 100 and/or components thereof. Specifically, the a diagnostic system 150 may be coupled to the data collection devices 135 to allow these data to be collected independent of and without the assistance of the valve controller 140 (i.e., the control system for the filtering and cleaning operations of the fabric filter system 100). The diagnostic system 150 includes a performance metrics diagnostic analysis module 155 that is configured to determine whether a performance of the baghouse fabric filter system 100 is degraded based on the data obtained from the data collection devices 135 associated with the plurality of operational and cleaning parameters. The performance metrics diagnostic analysis module 155 may be further configured to perform one or more targeted diagnostic analyses of the data associated with the plurality of operational and cleaning parameters. These analyses may be used to evaluate the performance metrics of the baghouse fabric filter system 100.

FIGS. 2-12 are flowcharts that illustrate operations for diagnosing a fabric filter, such as a baghouse, according to some embodiments of the inventive concept.

Figure 2:
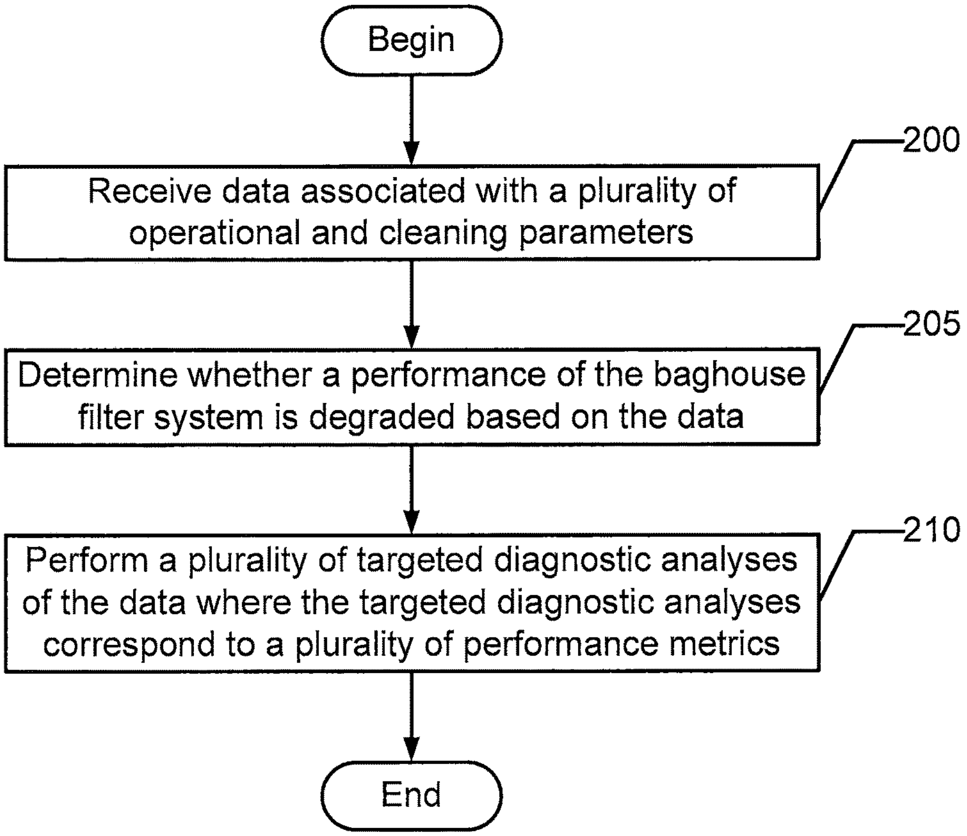
FIGS. 2-12 are flowcharts that illustrate operations for diagnosing a fabric filter, such as a baghouse, according to some embodiments of the inventive concept.

Referring to FIG. 2, operations begin at block 200 where the performance metrics diagnostic analysis module 155 of the diagnostic system 150 receives data associated with a plurality of operational and cleaning parameters of the baghouse filter system 100. The performance metrics diagnostic analysis module 155 determines whether a performance of the baghouse filter system 100 is degraded based on the received data at block 205. The performance metrics diagnostic analysis module 155 performed a plurality of targeted diagnostic analyses of the data at block 210. These targeted diagnostic analyses may correspond to a plurality of performance metrics used for evaluating the performance of the baghouse filter system 100.

Figure 3:
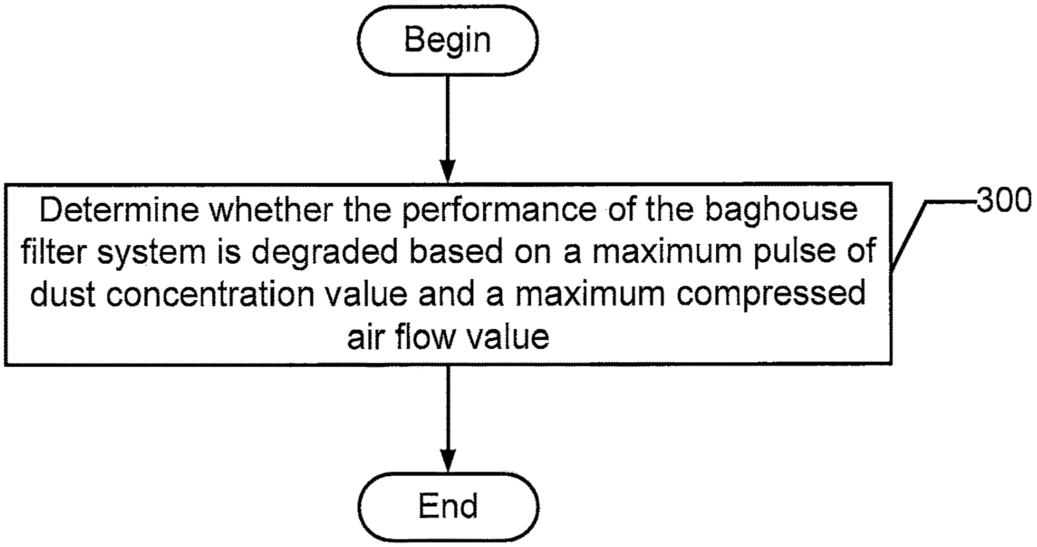

Referring now to FIG. 3, the performance metrics diagnostic analysis module 155 may use one or more criteria to determine when to perform the various targeted diagnostic analyses. In some embodiments, the performance metrics diagnostic analysis module 155 determines at block 300 whether the performance of the baghouse filter system 100 is degraded and more targeted diagnostic analyses are to be invoked based on a maximum pulse of dust concentration value and a maximum compressed air flow value. If both of these parameters are within normal ranges defined therefor, then the baghouse filter system 100 may be considered to be operating normally in response to a cleaning pulse. If however, either of these parameters falls outside the defined normal ranged, then one or more targeted diagnostic analyses may be performed. In other embodiments, the targeted diagnostic analyses may be performed even if the maximum pulse of dust concentration value and the maximum compressed air flow value are in normal ranges, respectively.

Figure 4:
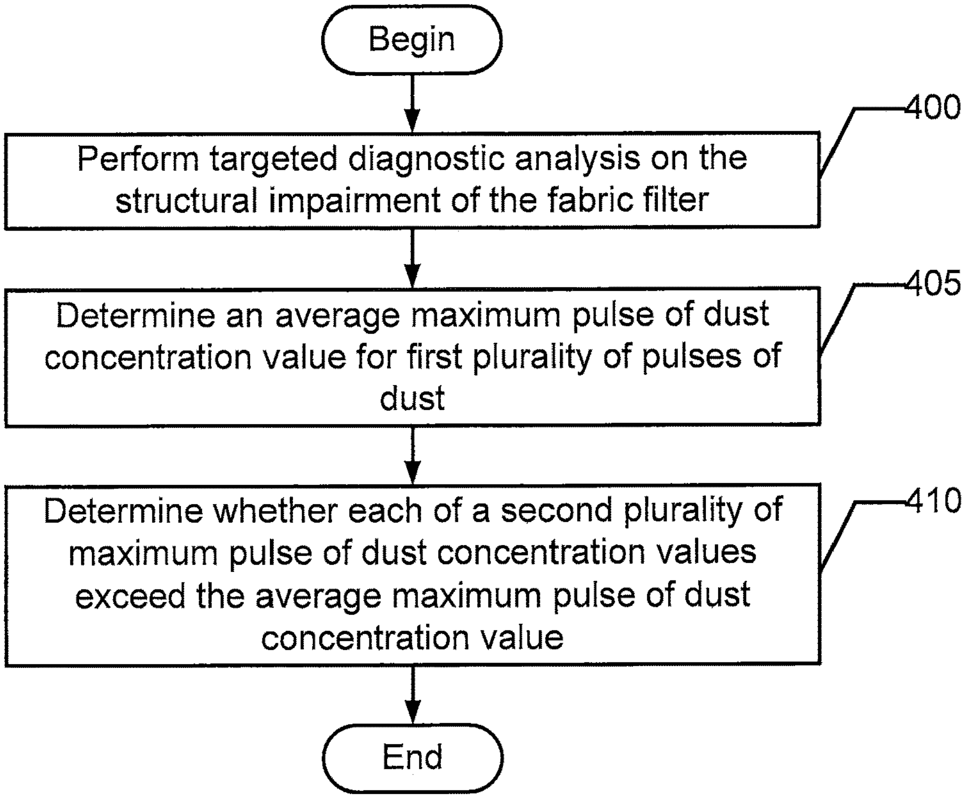

Various targeted diagnostic analyses, according to some embodiments of the inventive concept, will now be described with reference to FIGS. 4-12. Referring to FIG. 4, the performance metrics diagnostic analysis module 155 determines at block 400 that a targeted diagnostic analysis will be performed on the performance metric of a structural impairment of the fabric filter. At block 405 a determination of the average pulse of dust concentration value is made for a first plurality of pulses of dust. At block 410, a determination is made whether each of a second plurality of maximum pulse of dust concentration values exceeds the average determined at block 405. If the peak dust value has been continuously higher than the average peak dust value for the last defined number of pulses for a specific valve/row in the baghouse fabric filter 100, then this may be indicative of a leaking bag/row.

Figure 5:
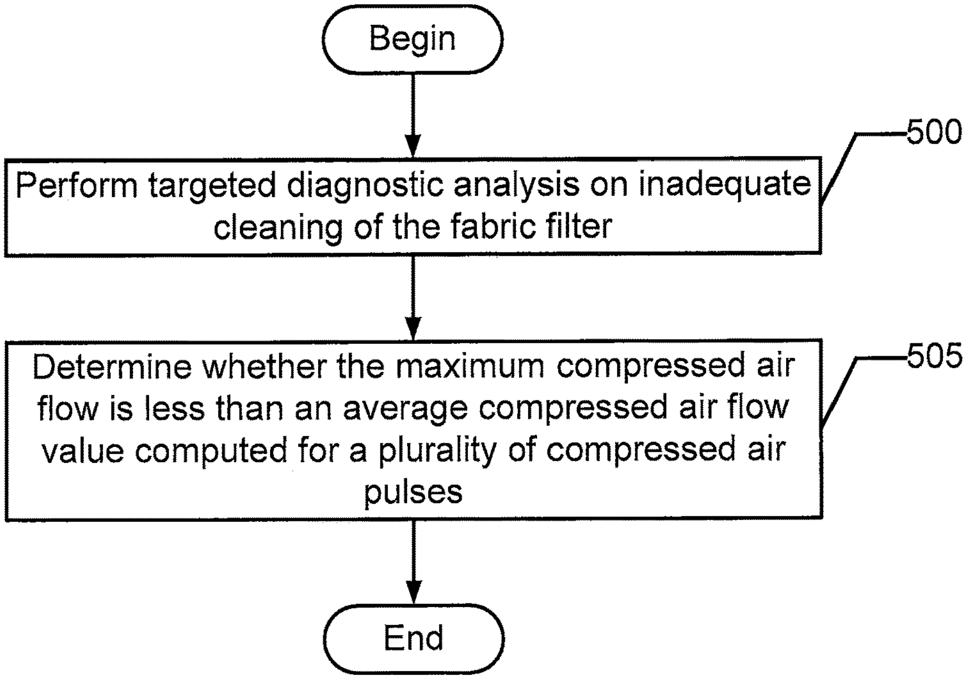
Figure 6:
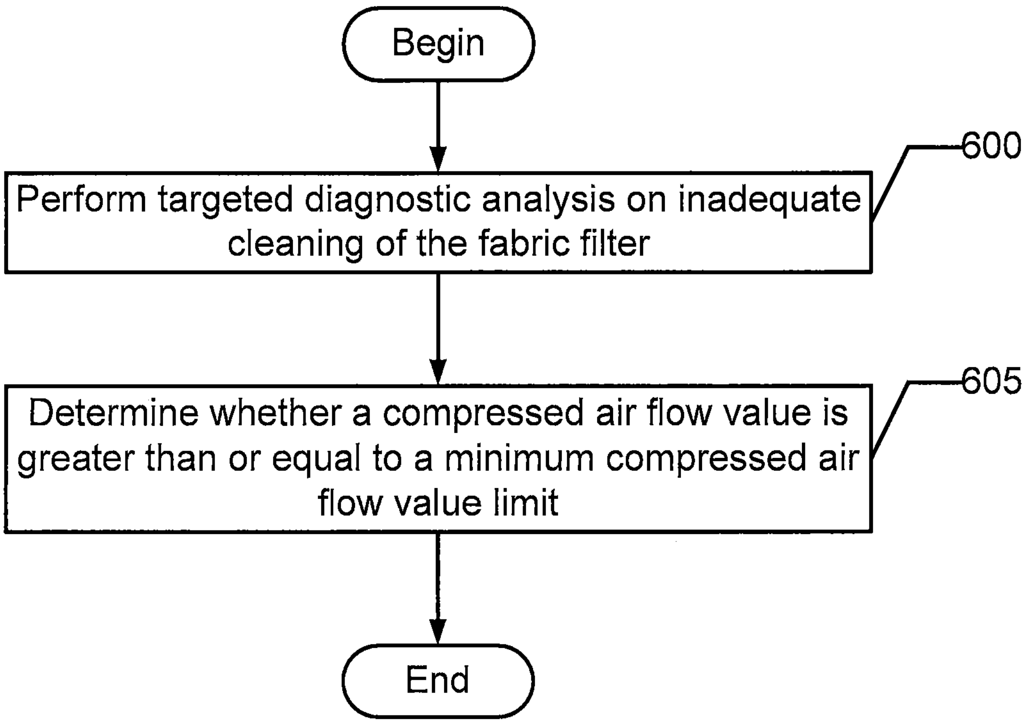
Figure 7:
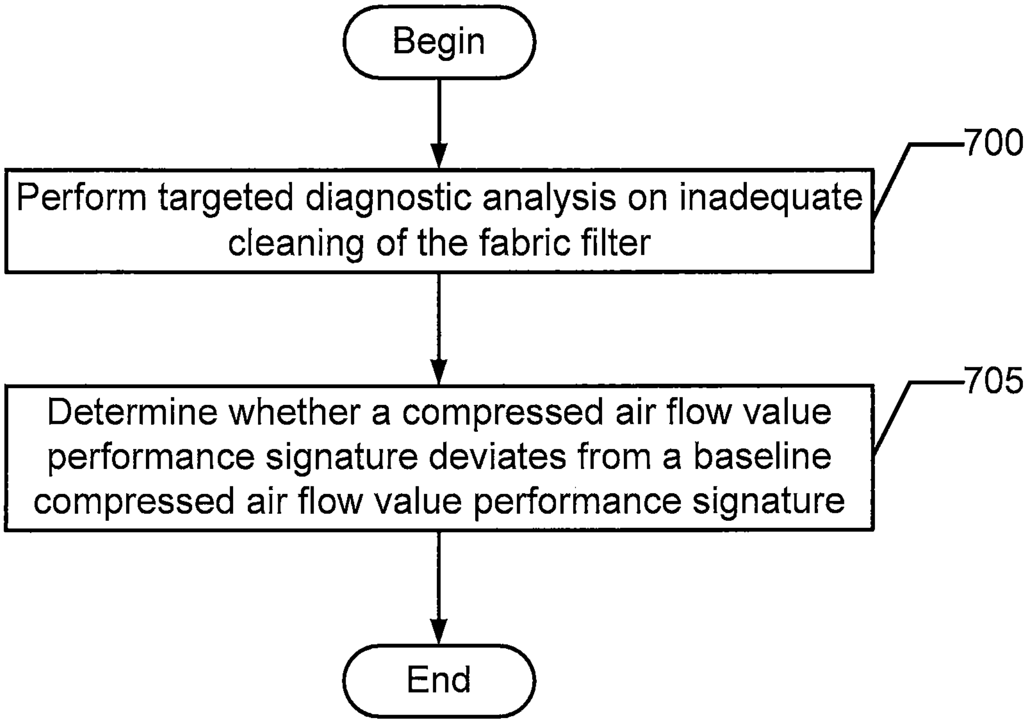

FIGS. 5-7 are directed to the targeted diagnostic analysis of inadequate cleaning of the fabric filter. Improper cleaning of the fabric filters may ultimately lead to premature failures in the filters, valves, etc., but also may be indications that the baghouse filter system 100 is not functioning at capacity.

Referring to FIG. 5, the performance metrics diagnostic analysis module 155 determines at block 500 that a targeted diagnostic analysis will be performed on the performance metric of an inadequate cleaning of the fabric filter. At block 505, a determination is made whether the maximum compressed air flow is less than an average compressed air flow value computed for a plurality of compressed air pulses.

Referring to FIG. 6, the performance metrics diagnostic analysis module 155 determines at block 600 that a targeted diagnostic analysis will be performed on the performance metric of an inadequate cleaning of the fabric filter. At block 605, a determination is made whether a compressed air flow value is greater than or equal to a minimum compressed air flow value limit.

Referring to FIG. 7, the performance metrics diagnostic analysis module 155 determines at block 700 that a targeted diagnostic analysis will be performed on the performance metric of an inadequate cleaning of the fabric filter. At block 705, a determination is made whether a compressed air flow value performance signature deviates from a baseline compressed air flow value performance signature. Air flow performance signatures in a baghouse filter system 100 are described in U.S. patent application Ser. No. 16/042,658 ('658 application), filed Jul. 23, 2018, entitled "Pulse-Jet Valve Performance Monitoring System and Method," which is hereby incorporated herein by reference in its entirety.

If any of the tests performed at blocks 505, 605, and 705 of FIGS. 5-7, respectively, are satisfied, then this may be indicative of one or more fabric filters being improperly or inadequately cleaned.

Figure 8:
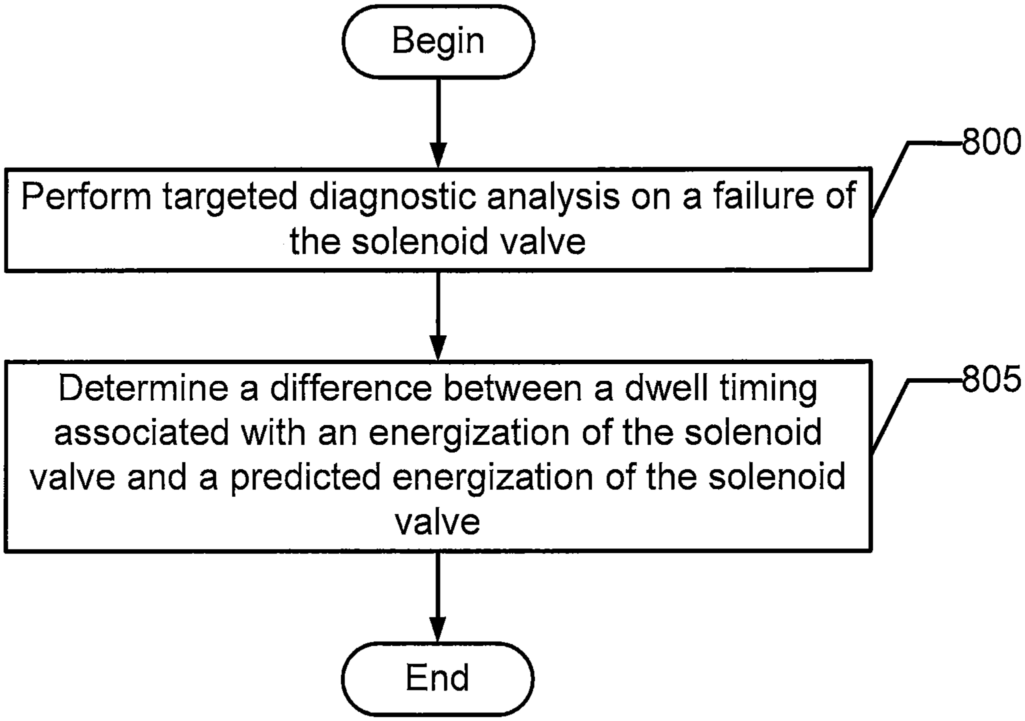

Referring to FIG. 8, the performance metrics diagnostic analysis module 155 determines at block 800 that a targeted diagnostic analysis will be performed on the performance metric of a failure of a solenoid valve, e.g., the solenoid pilot valve 125. At block 805, a determination of a difference between a dwell timing associated with an energization of the solenoid valve and a predicted energization of the solenoid valve is made. This difference may be indicative that the valve firing sequence is not following the predicted order.

Figure 9:
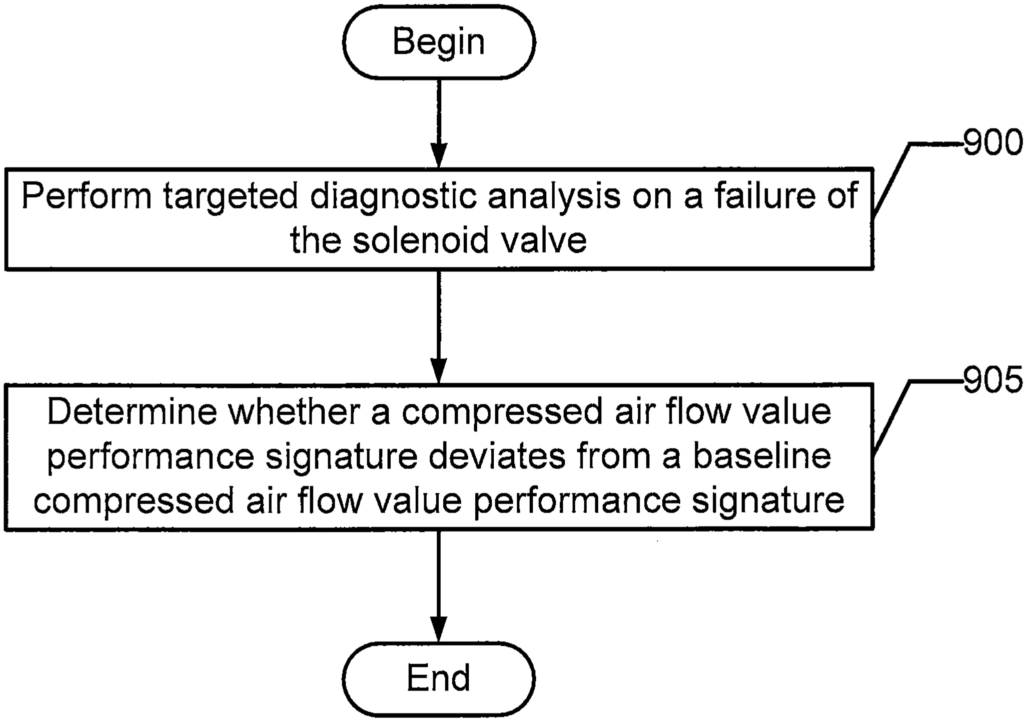

Referring to FIG. 9, the performance metrics diagnostic analysis module 155 determines at block 900 that a targeted diagnostic analysis will be performed on the performance metric of a failure of the solenoid valve, e.g., the solenoid pilot valve 125. At block 905, a determination is made whether a compressed air flow value performance signature deviates from a baseline compressed air flow value performance signature. Air flow performance signatures in a baghouse filter system 100 are described in the '658 application. A change in the compressed air statistical fingerprint can indicate a change in valve performance. These changes may be due to a variety of different parameters including, but not limited to, control relay performance, changes in the solenoid drive voltage, field wiring problems, solenoid wear, sticky plunger, and the like. The compressed air flow performance signature analysis of FIG. 9 may apply to other valves in the baghouse filter system 100 including both solenoid and/or diaphragm valves that are not electromechanical.

Figure 10:
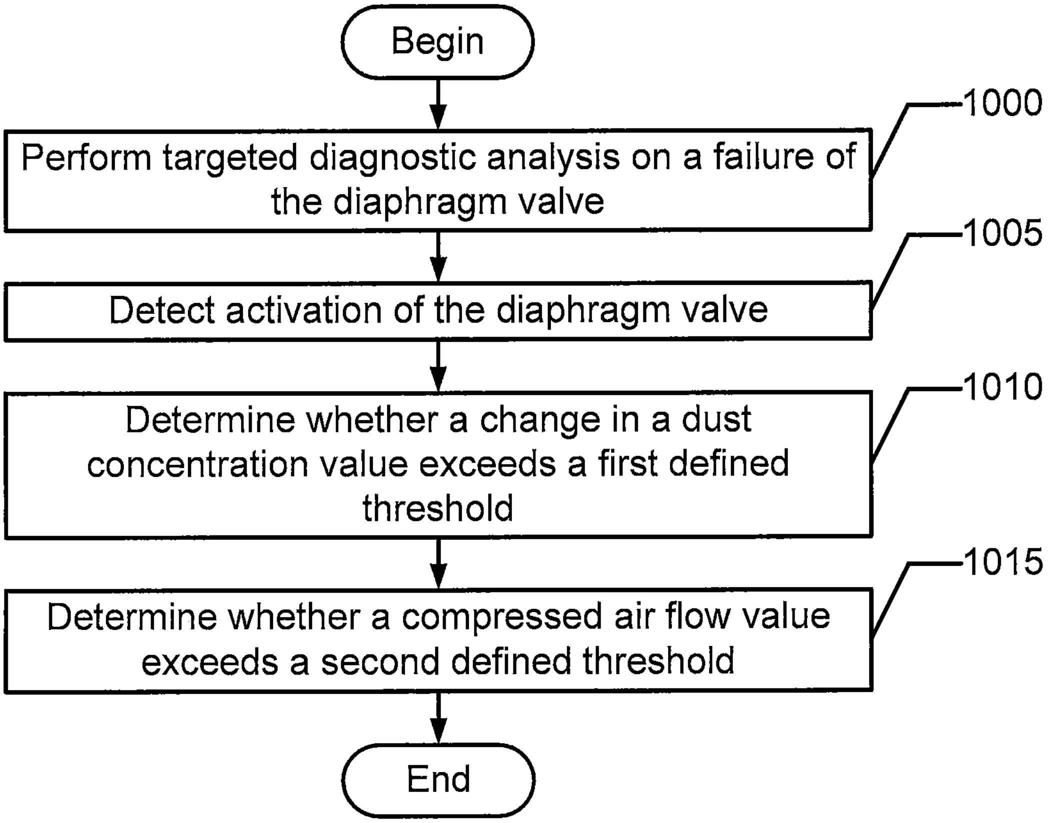

Referring to FIG. 10, the performance metrics diagnostic analysis module 155 determines at block 1000 that a targeted diagnostic analysis will be performed on the performance metric of a failure of a diaphragm valve, e.g., any valve with a diaphragm. At block 1005, activation or firing of the diaphragm valve is detected (e.g., activation of a solenoid). At block 1010, a determination of whether a change in a dust concentration value exceeds a first defined threshold is made. At block 1015, a determination is made whether a compressed air flow value exceeds a second defined threshold. If a valve fires, but there is not a substantial change in the dust concentration value and the total compressed air flow is minimal (value depends on the size of the valves used), then a diaphragm valve may be stuck or frozen.

Figure 11:
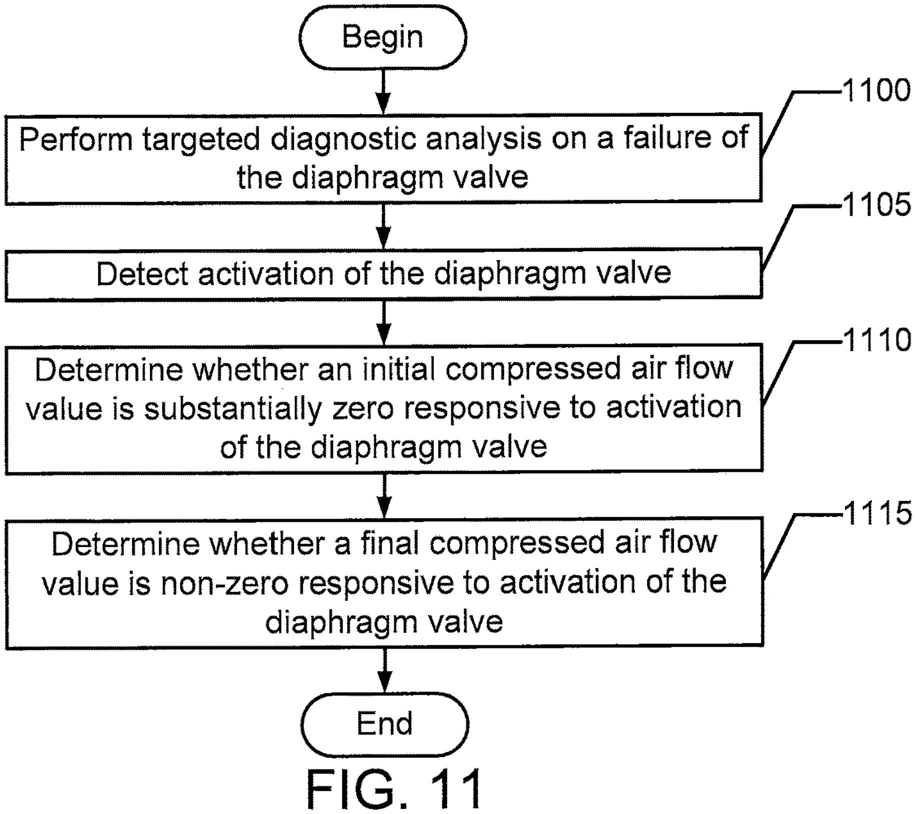

Referring to FIG. 11, the performance metrics diagnostic analysis module 155 determines at block 1100 that a targeted diagnostic analysis will be performed on the performance metric of a failure of a diaphragm valve, e.g., any valve with a diaphragm. At block 1105, activation or firing of the diaphragm valve is detected (e.g., activation of a solenoid). At block 1110, a determination is made whether an initial compressed air flow value is substantially zero responsive to activation of the diaphragm valve. At block 1115, a determination is made whether a final compressed air flow value is non-zero responsive to activation of the diaphragm valve. When a valve fires and the compressed air flow rate is approximately zero at the start of the firing sequence and the statistical data appears to be normal except the system does not return to zero, then this may be indicative of a leaking diaphragm valve.

Figure 12:
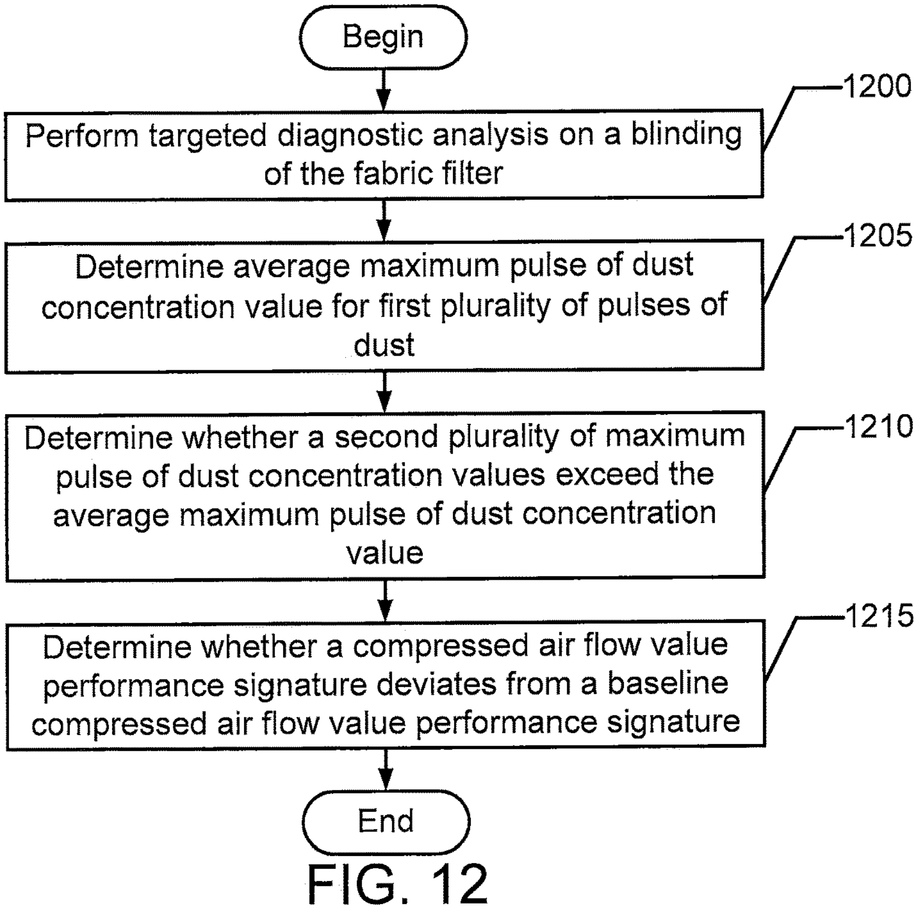

Referring to FIG. 12, the performance metrics diagnostic analysis module 155 determines at block 1200 that a targeted diagnostic analysis will be performed on the performance metric of a blinding of the fabric filter. A blinding may refer to a condition where the particulate matter is caked onto the fabric filter and it cannot be cleaned using standard methods. At block 1205, a determination is made of the average maximum pulse of dust concentration value for a first plurality of pulses of dust. At block 1210, a determination is made whether a second maximum pulse of dust concentration values exceed the average determined at block 1405. At block 1215, a determination is made whether a compressed air flow value performance signature deviates from a baseline compressed air flow value performance signature using one or more techniques described in the '658 application. If the peak dust value has been continuously lower than the average peak dust value for the last defined plurality of pulses for a particular valve/row and the compressed air maximum flow and air flow performance signature are normal, then one or more fabric filters may be blinded.

In the example targeted diagnostic analyses described above with respect to FIGS. 4-12, when the performance metrics diagnostic analysis module 155 detects that a valve has fired, for example, one or more of the operations of FIGS. 4-12 may be performed as part of a diagnostic routine. Embodiments of the inventive concept may provide more advanced statistics on valve performance beyond instantaneous flow rates and totalized flow. When the diagnostic routine ends due to another valve firing or it has timed out, the results of the diagnostic analyses may be evaluated for both normal and abnormal conditions.

Figure 13:
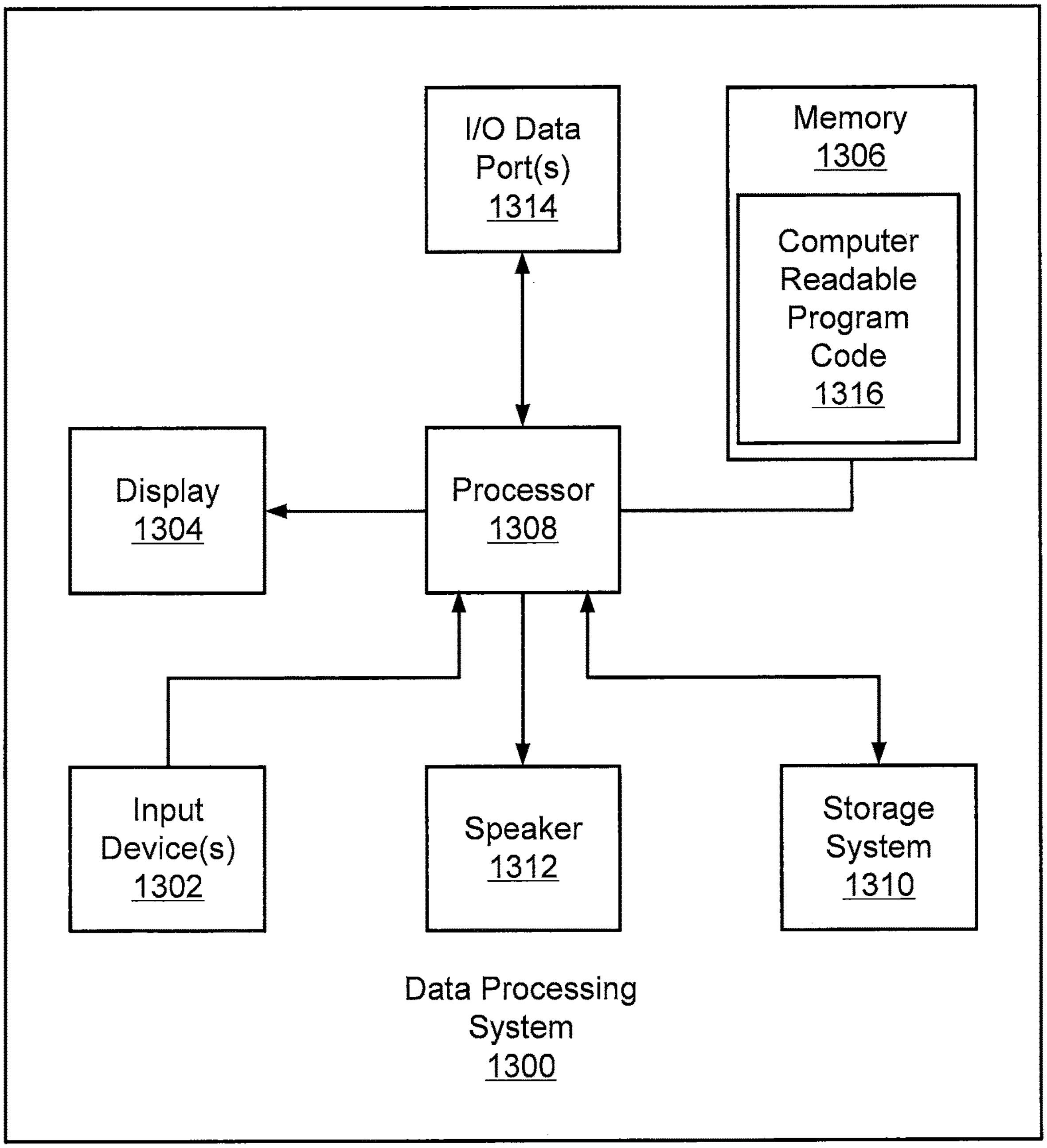
FIG. 13 is a data processing system that may be used to implement the performance metrics diagnostic analysis controller of FIG. 1 in accordance with some embodiments of the inventive concept.

Referring now to FIG. 13, a data processing system 1300 that may be used to implement the diagnostic system 150 of FIG. 1, in accordance with some embodiments of the inventive concept, comprises input device(s) 1302, such as a keyboard or keypad, a display 1304, and a memory 1306 that communicate with a processor 1308. The data processing system 1300 may further include a storage system 1310, a speaker 1312, and an input/output (I/O) data port(s) 1314 that also communicate with the processor 1308. The processor 1308 may be, for example, a commercially available or custom microprocessor. The storage system 1310 may include removable and/or fixed media, such as floppy disks, ZIP drives, hard disks, or the like, as well as virtual storage, such as a RAMDISK. The I/O data port(s) 1314 may be used to transfer information between the data processing system 1000 and another computer system or a network (e.g., the Internet). These components may be conventional components, such as those used in many conventional computing devices, and their functionality, with respect to conventional operations, is generally known to those skilled in the art. The memory 1306 may be configured with computer readable program code 1316 to determine whether a performance of the baghouse fabric filter system 100 is degraded based on the data obtained from the data collection devices 135 associated with the plurality of operational and cleaning parameters. The computer readable program code 1316 may be further configured to perform one or more targeted diagnostic analyses of the data associated with the plurality of operational and cleaning parameters.

Figure 14:
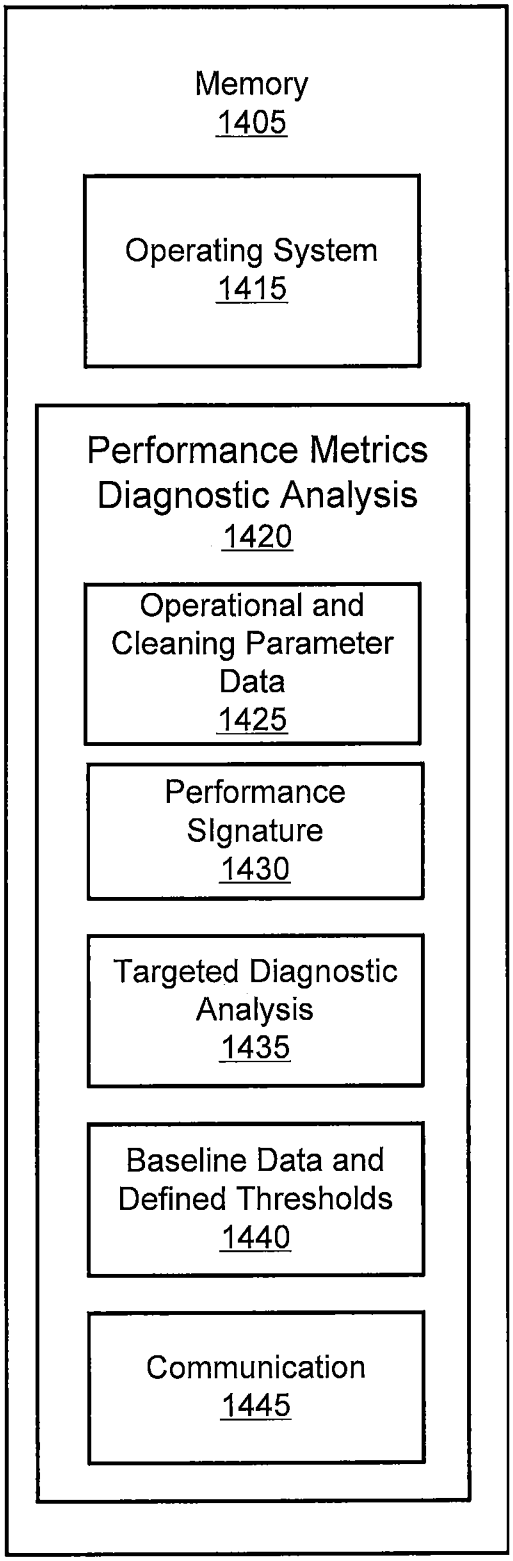
FIG. 14 is a block diagram that illustrates a software/hardware architecture for use in the performance metrics diagnostic analysis controller of FIG. 1 in accordance with some embodiments of the inventive concept.

FIG. 14 illustrates a memory 1405 that may be used in embodiments of data processing systems, such as the diagnostic system 150 of FIG. 1 and the data processing system 1300 of FIG. 13, respectively, to determine whether a performance of the baghouse fabric filter system 100 is degraded through the performance of one or more targeted diagnostic analyses of data associated with the plurality of operational and cleaning parameters according to some embodiments of the inventive concept. The memory 1405 is representative of the one or more memory devices containing the software and data used for facilitating operations of the diagnostic system 150 as described herein. The memory 1405 may include, but is not limited to, the following types of devices: cache, ROM, PROM, EPROM, EEPROM, flash, SRAM, and DRAM.

As shown in FIG. 14, the memory 1405 may contain two or more categories of software and/or data: an operating system 1415 and a performance metrics diagnostic analysis module 1420. In particular, the operating system 1415 may manage the data processing system's software and/or hardware resources and may coordinate execution of programs by the processor. The a performance metrics diagnostic analysis module 1420 may correspond to the performance metrics diagnostic analysis module 155 of FIG. 1 and may comprise an operational and cleaning parameter data module 1425, a performance signature module 1430, a targeted diagnostic analysis module 1435, a baseline data and defined thresholds module 1440, and a communication module 1445. In general, the performance metrics diagnostic analysis module 1420 may be configured to perform one or more of the operations described above with respect to the flowcharts of FIGS. 2-12. The operational and cleaning parameter data module 1425 may be configured to use the communication module 1445 to communicate with the data collection devices 135 to obtain data associated with a plurality of operational and cleaning parameters of the baghouse filter system 100. The performance signature module 1430 may be configured to perform a compressed air flow value performance signature analysis as described in the '658 application, which has been incorporated herein by reference. The targeted diagnostic analysis module 1435 may be configured to perform one or more targeted diagnostic analyses of the data associated with the plurality of operational and cleaning parameters. These analyses may be used to evaluate the performance metrics of the baghouse fabric filter system 100. The baseline data and defined thresholds module 1440 may be configured to provide the defined thresholds, ranges, baseline data, and the like that are used by the performance signature module 1430 and the targeted diagnostic analysis module 1435.

Although FIGS. 13 and 14 illustrate hardware/software architectures that may be used in data processing systems, such as the diagnostic system 150 of FIG. 1 in accordance with some embodiments of the inventive concept, it will be understood that the present invention is not limited to such a configuration but is intended to encompass any configuration capable of carrying out operations described herein.

Computer program code for carrying out operations of data processing systems discussed above with respect to FIGS. 1-14 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the diagnostic system 150 and the data processing system 1300 of FIG. 13 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a “circuit,” “module,” “component,” or “system.” Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the “C” programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

That which is claimed:

1. A system, comprising:

a baghouse filter system comprising a fabric filter, an air supply system, and a pulsing valve that is coupled to the air supply system and is configured to generate a statistical pulse of air that is directed to the fabric filter;

a control system coupled to the baghouse filter system that is configured to control filtering operations of the baghouse filter system and cleaning operations of the baghouse filter system;

a plurality of data collection devices that are configured to collect data associated with a plurality of operational and cleaning parameters of the baghouse filter system;

a diagnostic system that is configured to receive the data associated with the plurality of operational and cleaning parameters of the baghouse filter system independent of the control system, to determine whether a performance of the baghouse filter system is degraded based on the data associated with the plurality of operational and cleaning parameters, and to perform a plurality of targeted diagnostic analyses of the data associated with the plurality of operational and cleaning parameters, the plurality of targeted diagnostic analyses corresponding to a plurality of performance metrics of the baghouse filter system;

wherein the plurality of performance metrics comprises an improper setting used by the control system, which includes a header pressure setting, a temperature setting, and a gas flow rate setting; and wherein the diagnostic system is further configured to perform the plurality of targeted diagnostic analyses by performing a targeted diagnostic analysis on a structural impairment of the fabric filter; and wherein performing the targeted diagnostic analysis on the structural impairment of the fabric filter comprises:

operating the pulsing valve to generate a first plurality of pulses of dust;

determining an average maximum pulse of dust concentration value for the first plurality of pulses of dust;

operating the pulsing valve to generate a second plurality of pulses of dust; and determining whether each of a second plurality of maximum pulse of dust concentration values based on the second plurality of pulses of dust exceed the average maximum pulse of dust concentration value.

2. The system of claim 1, wherein the diagnostic system is further configured to determine whether the performance of the baghouse filter system is degraded based on a maximum pulse of dust concentration value within the fabric filter and a maximum compressed air flow value directed to the fabric filter.

3. The system of claim 2, wherein the plurality of operational and cleaning parameters comprises gas temperature, gas flow, exit dust concentration, differential pressure, compressed air header pressure, fan current, or hopper levels.

4. The system of claim 2, wherein the plurality of performance metrics further comprises the structural impairment of the fabric filter, an inadequate cleaning of the fabric filter, a failure of a solenoid valve, a failure of a diaphragm valve, a leak in a compressed air delivery system, a failure of a poppet valve, a failure of an isolation valve, and a blinding of the fabric filter.

5. The system of claim 4, wherein the diagnostic system is further configured to perform the plurality of targeted diagnostic analyses by performing a targeted diagnostic analysis on the inadequate cleaning of the fabric filter; and wherein performing the targeted diagnostic analysis on the inadequate cleaning of the fabric filter comprises:

determining whether the maximum compressed air flow value is less than an average maximum compressed air flow value computed for a plurality of compressed air pulses.

6. The system of claim 4, wherein the diagnostic system is further configured to perform the plurality of targeted diagnostic analyses by performing a targeted diagnostic analysis on the inadequate cleaning of the fabric filter; and wherein performing the targeted diagnostic analysis on the inadequate cleaning of the fabric filter comprises:

determining whether a compressed air flow value is greater than or equal to a minimum compressed air flow value limit.

7. The system of claim 4, wherein the diagnostic system is further configured to perform the plurality of targeted diagnostic analyses by performing a targeted diagnostic analysis on the inadequate cleaning of the fabric filter; and wherein performing the targeted diagnostic analysis on the inadequate cleaning of the fabric filter comprises:

determining whether a compressed air flow value performance signature deviates from a baseline compressed air flow value performance signature.

8. The system of claim 4, wherein the diagnostic system is further configured to perform the plurality of targeted diagnostic analyses by performing a targeted diagnostic analysis on the failure of the solenoid valve; and wherein performing the targeted diagnostic analysis on the failure of the solenoid valve comprises:

determining a difference between a dwell timing associated with an energization of the solenoid valve and a predicted energization of the solenoid valve.

9. The system of claim 4, wherein the diagnostic system is further configured to perform the plurality of targeted diagnostic analyses by performing a targeted diagnostic analysis on the failure of the solenoid valve; and wherein performing the targeted diagnostic analysis on the failure of the solenoid valve comprises:

determining whether a compressed air flow value performance signature deviates from a baseline compressed air flow value performance signature.

10. The system of claim 4, wherein the diagnostic system is further configured to perform the plurality of targeted diagnostic analyses by performing a targeted diagnostic analysis on the failure of the diaphragm valve; and wherein performing the targeted diagnostic analysis on the failure of the diaphragm valve comprises:

detecting an activation of the diaphragm valve;

determining whether a change in a dust concentration value exceeds a first defined threshold; and determining whether a compressed air flow value exceeds a second defined threshold.

11. The system of claim 4, wherein the diagnostic system is further configured to perform the plurality of targeted diagnostic analyses by performing a targeted diagnostic analysis on the failure of the diaphragm valve; and wherein performing the targeted diagnostic analysis on the failure of the diaphragm valve comprises:

determining whether a compressed air flow value performance signature deviates from a baseline compressed air flow value performance signature.

12. The system of claim 4, wherein the diagnostic system is further configured to perform the plurality of targeted diagnostic analyses by performing a targeted diagnostic analysis on the failure of the diaphragm valve; and wherein performing the targeted diagnostic analysis on the failure of the diaphragm valve comprises:

detecting an activation of the solenoid valve;

determining whether an initial compressed air flow value is substantially zero responsive to activation of the solenoid valve; and determining whether a final compressed air flow value is non-zero responsive to deactivation of the solenoid valve.

13. The system of claim 4, wherein the diagnostic system is further configured to perform the plurality of targeted diagnostic analyses by performing a targeted diagnostic analysis on the blinding of the fabric filter; and wherein performing the targeted diagnostic analysis on the blinding of the fabric filter comprises:

determining an average maximum pulse of dust concentration value for a first plurality of pulses of dust;

determining whether a second plurality of maximum pulse of dust concentration values exceed the average maximum pulse of dust concentration value; and determining whether a compressed air flow value performance signature deviates from a baseline compressed air flow value performance signature.

14. A method, comprising:

receiving data associated with a plurality of operational and cleaning parameters of a baghouse filter system independent of a control system configured to control filtering and cleaning operations of the baghouse filter system, the baghouse filter system comprising an air supply system, and a pulsing valve that is coupled to the air supply system and is configured to generate a statistical pulse of air that is directed to a fabric filter;

determining whether a performance of the baghouse filter system is degraded based on the data associated with the plurality of operational and cleaning parameters;

performing a plurality of targeted diagnostic analyses of the data associated with the plurality of operational and cleaning parameters, the plurality of targeted diagnostic analyses corresponding to a plurality of performance metrics of the baghouse filter system;

wherein the plurality of performance metrics comprises an improper setting used by the control system, which includes a header pressure setting, a temperature setting, and a gas flow rate setting; and wherein performing the plurality of targeted diagnostic analyses comprises:

operating the pulsing valve to generate a first plurality of pulses of dust;

determining an average maximum pulse of dust concentration value for the first plurality of pulses of dust;

operating the pulsing valve to generate a second plurality of pulses of dust; and determining whether each of a second plurality of maximum pulse of dust concentration values based on the second plurality of pulses of dust exceed the average maximum pulse of dust concentration value.

15. The method of claim 14, determining whether the performance of the baghouse filter system is degraded comprises determining whether the performance of the baghouse filter system is degraded based on a maximum pulse of dust concentration value within the fabric filter and a maximum compressed air flow value directed to the fabric filter.

16. The method of claim 15, wherein the plurality of operational and cleaning parameters comprises: gas temperature, gas flow, exit dust concentration, differential pressure, compressed air header pressure, fan current, or hopper levels.

17. The method of claim 15, wherein the plurality of performance metrics further comprises a structural impairment of the fabric filter, an inadequate cleaning of the fabric filter, a failure of a solenoid valve, a failure of a diaphragm valve, a leak in a compressed air delivery system, a failure of a poppet valve, a failure of an isolation valve, and a blinding of the fabric filter.

18. The method of claim 17, wherein performing the plurality of targeted diagnostic analyses comprises performing a targeted diagnostic analysis on the structural impairment of the fabric filter, on the inadequate cleaning of the fabric filter, on the failure of the solenoid valve, on the failure of the diaphragm valve, or on the blinding of the fabric filter.

* * * * *